Jan. 27, 1970
D. T. THOMPSON
3,491,704
MANDREL FOR AUTOMATIC BAGEL FORMING MACHINE
Filed Jan. 19, 1968
2 Sheets-Sheet 1
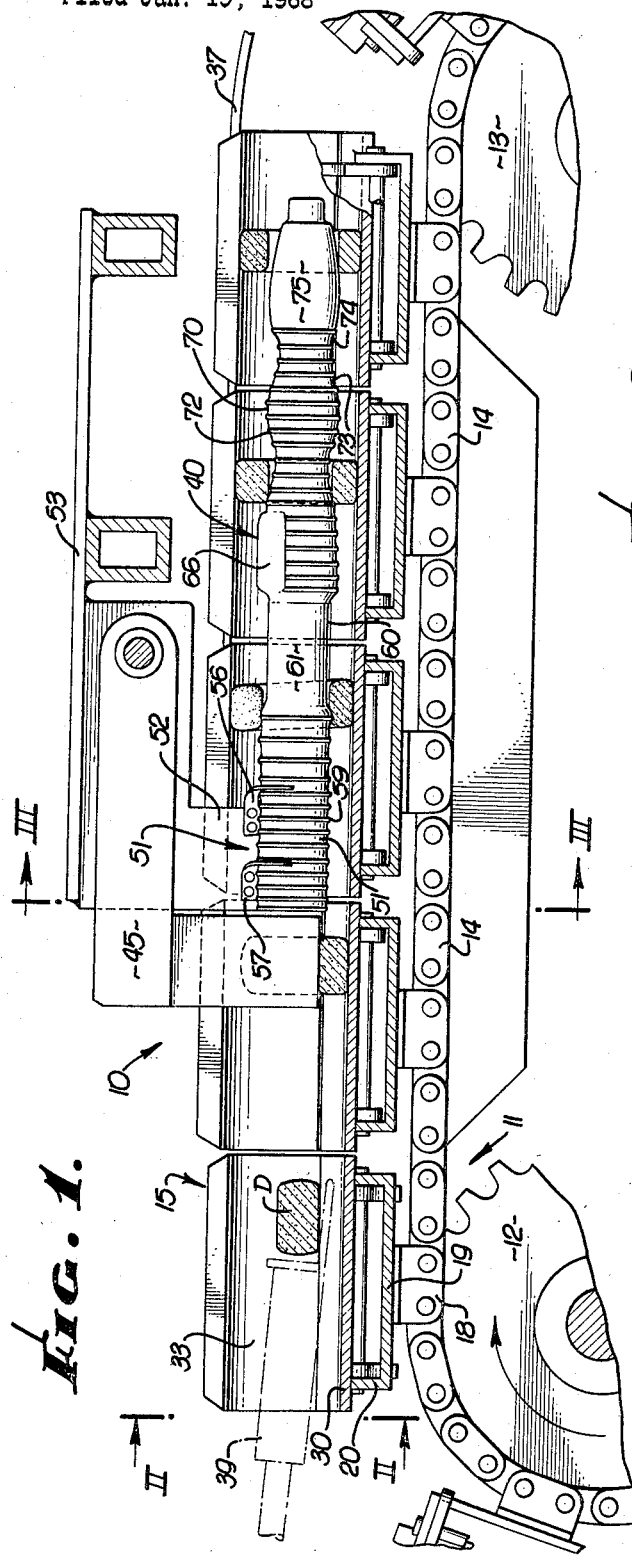
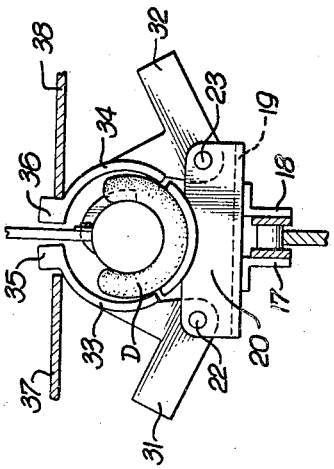
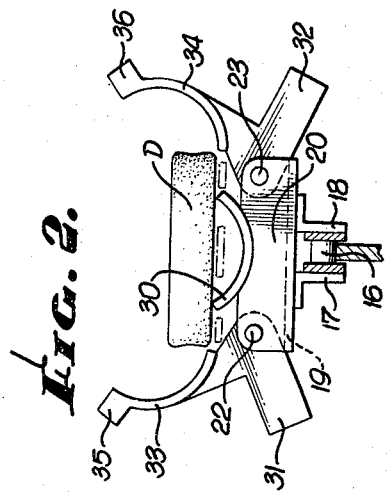
INVENTOR.
DANIEL T. THOMPSON
By
Miketta, Glenny, Poms & Smith
ATTORNEYS.

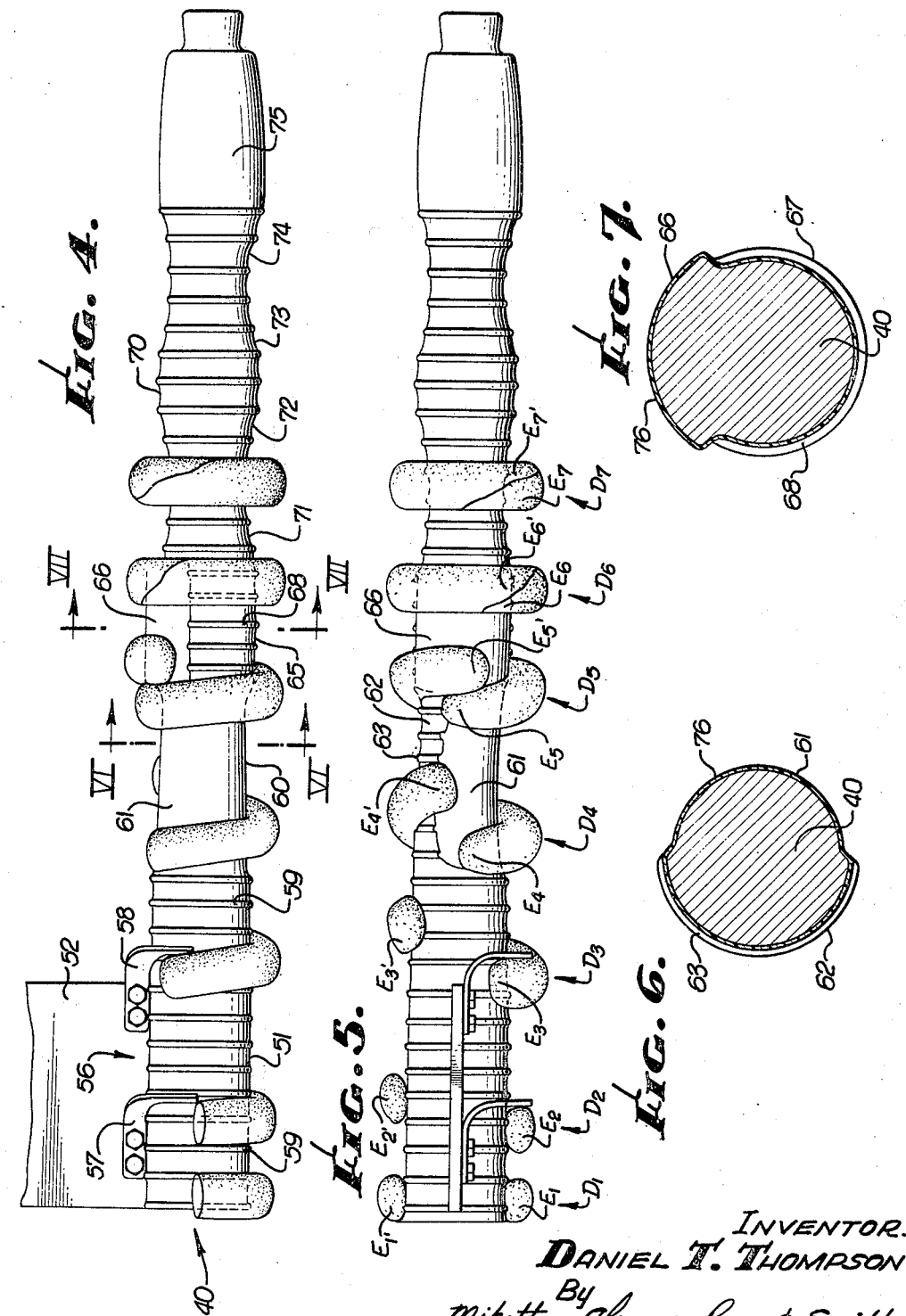

United States Patent Office 3,491,704
Patented Jan. 27, 1970

3,491,704
MANDREL FOR AUTOMATIC BAGEL FORMING MACHINE
Daniel T. Thompson, Los Angeles, Calif., assignor to Thompson Bagel Machine Mfg. Corp., Los Angeles, Calif., a corporation of California
Filed Jan. 19, 1968, Ser. No. 699,187
Int. Cl. A21c 3/08
U.S. Cl. 107—8                                   10 Claims

ABSTRACT OF THE DISCLOSURE

An apparatus for continuously forming toroids from irregularly shaped pieces of dough, such as in the manufacture of bagels, which includes a mandrel about which a strip of dough is formed into a toroid, the mandrel including means for effectively overlapping the ends of the dough strip and combining such ends into a homogeneous mass so as to form an endless homogeneous toroid of dough. Overlapping is achieved by curved fingers on the periphery of the mandrel which retard the axial advance of one end of the dough strip as the dough strip is increased to a length greater than the periphery of the mandrel. The retarded end is accelerated to contact the other end of the dough strip by a section of the mandrel having a smooth, 180 degree arcuate segment of reduced diameter, the contacting ends of the split dough ring thus formed are kneaded into a smooth, continuous homogeneous toroidal arcuate segment by a section of the mandrel of varying diameter having arcuate ridges over a portion thereof.

In the art of forming and making bagels, the first step is to make up a batch of dough using a recipe or formula preferred by the particular baker making the bagels. It is well known that the dough used in making bagels is generally relatively heavy dough and elastic so that it cannot be formed in the same manner as other dough products, such as that known as doughnuts. While in the past, the most common manner of forming bagel dough has been manually, it is now known in the prior art to form such bagel dough by various mechanical means.

Such prior art devices are exemplified in Patents Nos. 1,522,430, 2,584,514, Reissue No. 25,536, and my copending applications Ser. Nos. 526,474 now Patent No. 3,371,624 and 541,795 now Patent No. 3,433,182. In all of these prior art devices, there is shown toroid forming means, which includes means for supporting a strip of dough, a mandrel about which dough is formed, and means for providing axial movement between the mandrel and the supporting means. In some of such prior art devices, such as Patent No. 1,552,430, and Reissue No. 25,536, the mandrel is shown and described as a cylindrical rod having a smooth surface. In another type of apparatus, shown in Patent No. 2,584,514, there is shown a mandrel having a plurality of circumferential grooves on the outer surface of the mandrel which causes the strip of dough to rotate about its own axis.

In my copending application, Ser. No. 541,795, now Patent No. 3,433,182, there is shown a mandrel having a tapered nose portion, a generally cylindrical body, and a chamfered end portion, the outer surface of the body portion being serrated and the forward end of the body portion having an end retarding barrier. In this manner, one end of the dough strip is retarded axially with respect to the other end of the dough strip.

The above-described prior art device mandrel, except for that shown in my copending patent application Ser. No. 541,795, now Patent No. 3,433,182, fail entirely to provide effective structure for allowing one end of the dough strip to be retarded so that the entire strip may be lengthened whereby considerable overlap is obtained which can then be kneaded into a homogenous mass of dough. These prior art devices were inadequate in that they failed to allow effective lengthening and overlap because the two dough strip ends abutted and therefore the ends of the dough strip could not be properly kneaded and worked. This resulted in possible separability when the toroid of dough was subsequently baked and also failed to provide the desirable finished appearance of an endless toroid of dough.

Moreover, the mandrel shown and described in my copending patent application Ser. No. 541,795, now Patent No. 3,433,182 although showing a barrier for retarding one end of the dough strip during is formation as a toroid, did not completely solve the attendant problems. First, it was occasionally found that the barrier did not provide sufficient retardation of one end of the dough strip so that as the strip was lengthened the two ends contacted prior to sufficient overlap. Second, it was found that an attempt to provide further retardation of one end of the dough strip resulted in an excessive and inordinate travel of the dough strip along the mandrel before the ends were properly brought in contact after the desired amount of overlap was obtained. There were also disadvantages in the means provided on the surface of the mandrel for causing the toroid of dough to rotate about its own axis. Finally, it was also found that the kneading and working of the overlapped ends of the dough strip were not always properly accomplished so as to work the dough strip ends into a homogeneous mass during travel of the dough strip along the mandrel.

Accordingly, it is a general object of the present invention to provide a mandrel for use in an automatic bagel forming machine that avoids all of the foregoing disadvantages of similar types of machines used heretofore.

An object of the present invention is to provide a mandrel for use in an apparatus which transformers a strip of dough into an endless toroid of dough in which the mandrel includes means for retarding one end of the strip of dough relative to the other end and subsequently advancing the retarded end at a rate exceeding that of the other end so that lengthening of the strip and substantial overlap of the ends may be obtained.

It is another object of the present invention to provide a mandrel for use in an apparatus of the above-described type in which the mandrel includes means for retarding one end of the dough strip relative to the other and subsequently advancing such retarded ends and additionally includes means for effectively rotating the dough strip about its own axis during its travel relative to the mandrel.

It is yet another object of the present invention to provide a mandrel for use in an apparatus of the above-described type including means for retarding one end of a dough strip relative to the other end, subsequently advancing such retarded end after the entire dough strip is lengthened, and compressing, kneading, and working the overlapped ends of the dough strip to effect a homogeneous mass of dough.

It is still another object of the present invention to provide a mandrel for use in an apparatus of the above-described type in which the mandrel includes means for retarding one end of an advancing dough strip relative to the other end and subsequently changing the relative axial speeds of the two dough strip ends so that the retarded end, after sufficient overlap is obtained, axially contacts the other end and the overlapped ends may be kneaded and compressed to form a homogeneous endless toroid of dough.

These and various other objects and advantages of the present mandrel for use in an apparatus for forming endless toroids of dough will become apparent to those skilled in the art from a consideration of the following detailed explanation of an exemplary embodiment thereof. Reference will be made to the apended sheets of drawings in which:

FIG. 1 is a side sectional view of an apparatus for forming endless toroids of dough in rapid succession, utilizing an exemplary mandrel constructed in accordance with the present invention;

FIG. 2 is a detailed view of the apparatus shown in FIG. 1 taken along the line II—II showing an open dough strip supporting sleeve assembly receiving a strip of dough carried thereto by exemplary carrying means;

FIG. 3 is a detailed view of the apparatus shown in FIG. 1 taken along the line III—III showing the dough strip supporting sleeve assembly in a closed position about a strip of dough;

FIG. 4 is a side elevation view of a mandrel for use in the above-shown apparatus constructed in accordance with the present invention and showing successive positions of a strip of dough in relation to the mandrel;

FIG. 5 is a side elevation view of the mandrel shown in FIG. 4 and illustrating the strip of dough in the successive position as shown in FIG. 4;

FIG. 6 is an end sectional view of the mandrel taken along the line VI—VI of FIG. 4; and FIG. 7 is an end sectional view of the mandrel taken along the line VII—VII of FIG. 4.

Referring now to FIGS. 1 through 3 there is shown an exemplary apparatus in which the mandrel of the present invention may be used. The apparatus shown comprises the toroid forming sub-assembly of the entire automatic feeding cut-off and bagel forming machine of my copending application Ser. No. 541,795 now Patent No. 3,433,182. It will be understood that the mandrel of the present invention is not only adapted for use in the particular apparatus described herein but is equally adapted for use in other apparatus, such as in the above-mentioned prior art apparatus. A complete description of this apparatus may be found in my above-identified copending application, and only a brief description of pertinent portions thereof will be given herein.

The toroid forming assembly is shown generally by the reference numeral 10 and comprises a chain assembly 11 including sprockets 12, 13 and links 14. The sprockets are supported by a frame (not shown) and are driven by a suitable power source in a manner well known in the art.

Means for supporting a dough strip D, indicated generally at 15, is carried by particular chain links 16 (see FIGS. 2 and 3) to which are attached angle brackets 17, 18 on which is mounted a support assembly base 19. At opposite ends of base 19 are mounted a pair of opposed sidewalls 20, 21 which in turn support a pair of pivot pins 22, 23. Fixedly mounted to the base 19 is a support base cup section 30. A pair of arms 31, 32 mounted on pivot pins 22, 23 support respective side cup sections 33, 34 respectively. At the upper end of each of the side cup sections 33, 34 are provided guide projections 35, 36, respectively. The guide projections 35, 36 operate to close the side cup sections 33, 34 by engagement with fixed cam rails 37, 38 respectively.

In FIG. 2, there is shown the side cup sections 33, 34 in their open position for receiving the flat dough strip D delivered to the dough srip support means 15 by a carrier 39. In FIG. 3, the side cup sections are shown in a substantially closed position which corresponds to the position of the dough strip as it commences contact with a mandrel, indicated generally at 40. It will be understood that the cam rails 37, 38 are so positioned that in subsequent movement of the support assembly 15 past the forward end of the mandrel the side cup sections 33, 34 will be fully closed so as to form an inner cylindrical surface.

In operation, a dough strip D is initially positioned on the support assembly 15 by means of carrier 39, indicated in phantom lines. At this point in the translatory movement of the dough strip, the side cup sections 33, 34 are rotated to their lowermost positions around pivot pins 22, 23 so that a dough strip of required length may be transversely positioned with respect to the axis of the mandrel and the movement of the dough strip. The projections 35, 36 on side cup sections 33, 34 are engaged by cam rails 37, 38 as the support assembly is translated through chain assembly 11 so that the side sections are progressively moved toward one another. In order to provide a generally U-shape of the dough strip prior to its contact with the mandrel 40, there is provided a pivotally mounted feeding means indicated at 45 which contacts the middle portion of the dough strip D at the time the side cup sections 33, 34 are closed. Thus, when the dough strip reaches the forward end of the mandrel 40, such strip has been performed into a U-shape or semicircle configuration.

It will be understood that as the dough strip D is carried axially with respect to the mandrel 40 by the support means 15, the dough strip is progressively compressed between the inner surface of the support assemblies and the outer surface of the mandrel. It will also be understood that in other types of apparatus, the mandrel may be moved relative to stationary forming sleeves.

Turning now to the subject of the present invention, the mandrel 40 is supported at a first axially extending forward portion 51 by an arm 52 attached to the frame 53. Mandrel 40, as seen best in FIGS. 4 and 5, includes means for initially retarding the axial movement of one end of the U-shaped dough strip relative to the other end thereof. The retarding means is positioned on the first axially extending portion 51 of the mandrel 40 and comprises a barrier means indicated at 56. Barrier means 56 comprises a pair of curved fingers 57, 58 supported at their forward ends by fasteners to mandrel support arm 52.

The mandrel 40 is of generally cylindrical longitudinally extending shape and includes on first portion 51 a series or plurality of axially or longitudinally spaced circumferential parallel ridges, indicated at 59. Such ridges extend substantially over the entire first forward portion 51 of the mandrel.

A second axially extending portion 60 of mandrel 40 includes means for advancing the retarded end of the dough strip D. As the dough strip moves over the forward portion 51 of the mandrel, the circumferential ridges 59 will cause the dough strip to rotate about its own axis. This action combined with the increasing pressure of the side cup sections 33, 34 will cause the dough strip to lengthen. Substantial lengthening of the dough strip occurs in the first portion 51 of mandrel 40 and progresses during its movement over the second portion 60 thereof. The means for advancing the retarded end of the dough strip includes a smooth surface arcuate segment which extends axially, and is indicated generally at 61. Arcuate segment 61 subtends approximately 180° of the circumference of the second portion 60 of mandrel 40. As seen best in FIG. 6, arcuate segment 61 comprising the smooth surface extends in cross-section from substantially the top to the bottom of the mandrel 40. Smooth surfaced segment 61 has a diameter which is less than that of first portion 55 of the mandrel.

With continued attention to FIGS. 4, 5 and 6, it will also be seen that the second portion 60 of mandrel 40 includes a complementary arcuate segment 62 over which is disposed arcuate parallel axially spaced-apart ridges 63. Arcuate segment 62 has a diameter substantially equal to the diameter of first portion 51 of mandrel 40, but may have a diameter which decreases slightly in the rearward axial direction, as in the exemplary embodiment illustrated in FIG. 5.

Mandrel 40 also includes means for kneading, working and compressing the overlapped ends of dough strip D positioned on a third portion 65. This means comprises a smooth surfaced axially extending arcuate segment 66 having a diameter which exceeds that of the first portion 51 of mandrel 40. Arcuate segment 66, as seen best in FIG. 7, extends in a substantially equal arcuate direction from the top of mandrel 40. A complementary arcuate segment also axially extending, indicated at 67 includes a series of spaced apart arcuate ridges 68. As seen in FIG. 5, the diameter of smooth surface arcuate segment 66 is constant over the axially extending third portion 65 of mandrel 40, but complementary arcuate segment 67 may have an axially rearwardly decreasing diameter.

Mandrel 40 includes a fourth portion 70 which includes means for alternately working and relieving the kneading and working action of the mandrel in conjunction with the dough strip support means by having, in the axial rearward direction, a decreasing diameter indicated at 71, an increasing diameter indicated at 72, a decreasing diameter indicated at 73, and an increasing diameter indicated at 74.

Mandrel 40 also includes a fifth or discharge portion 75 having a smooth surface and a slightly axially rearwardly decreasing diameter. The mandrel, constructed of metal, may be provided with a coating or layer of material 76 to prevent the dough from adhering to the outer surface of mandrel 40.

The progressive formation of the toroid of dough from the dough strip D may be explained now with particular attention to FIGS. 4 and 5. Initially, as dough strip D commences contact with mandrel 40, it will be seen that the dough strip is substantially U-shaped or a semicircular strip $D_1$. At this point there is no axial displacement between ends $E_1$ and $E_{1'}$. Axial movement of the dough strip over first portion 51 of mandrel 40 to the position $D_2$ will be seen to cause dough strip end $E_2$ to be axially retarded with respect to dough strip end $E_{2'}$. Further axial movement of the dough strip to the position $D_3$, will be seen to further axially retard dough strip end $E_3$ with respect to end $E_{3'}$. It will also be seen that movement of the dough strip with respect to mandrel 40 due to the ridges 59 on first portion 51 will cause the dough strip to rotate about its axis thereby kneading and working the dough. This kneading and working of the dough in conjunction with the increasingly smaller area between the dough strip support means 15 and the mandrel 40 will cause the dough strip to be elongated as may be seen by comparing the dough strip at positions $D_1$, $D_2$ and $D_3$ in FIG. 5.

Passing from the first portion 51 of mandrel 40 to the second portion 60, the dough strip, indicated at $D_4$, will be seen to have end $E_{4'}$ in continuing contact with ridges 63 on complementary arcuate segment 62 but that end $E_4$ in contact with the smooth surface of arcuate segment 61 will advance more rapidly (due to the decreased diameter and lesser contact with the mandrel surface). End portion $E_4$ will continue to advance more rapidly than $E_{4'}$ so that at the rearward end of second portion 60 the end $E_5$ will have contacted end $E_{5'}$. Thus, the dough strip has been elongated while one end was axially retarded with the other so that the ends did not abut during the circumferential expansion. At the end of the elongation or lengthening period, the ends are now overlapped and in axial contact as seen by position $D_5$.

The ends of the dough strip are now kneaded, worked and compressed by smooth arcuate segment 66, having an increased diameter, on third portion 65 of mandrel 40, as indicated by the position of the dough strip at $D_6$. Ends $E_6$ and $E_{6'}$ are kneaded together so as to form a continuous toroid. This kneading action is provided by the rotation of the dough strip about its own axis due to the ridges 68 on the complementary arcuate segment 67.

Continued kneading and working of the dough strip is provided by the compression and relief fourth portion 70 of the mandrel 40. As shown at $D_7$, the dough strip ends $E_7$ and $E_{7'}$ are continually worked so that when the dough strip reaches the rearwardmost portion 75 of the mandrel it is completely formed as a homogeneous toroid of dough and is discharged from the decreased diameter rearward end of the mandrel.

I claim:

1. In an apparatus for converting a strip of dough into a toroid, comprising toroid forming means including, a longitudinally extending generally cylindrical mandrel, means for supporting the dough strip transvserly of the mandrel axis, means for providing axial toroid forming movement between the mandrel and the supporting means so that the dough strip moves axially relative to the mandrel, the supporting means providing circumferential contact between the mandrel and the strip of dough as it moves relative to the mandrel, the provision of:

said mandrel including means for initially retarding the axial movement of one end of the dough strip relative to the other end thereof as the dough strip moves axially along the mandrel, means for axially advancing said retarded end of the dough strip so as to contact said other end after the dough strip has been lengthened during axial movement of the dough strip whereby said dough strip ends are substantially overlapping and the dough strip is toroidally shaped, and means for kneading and compressing said overlapped ends to work said dough strip ends into a single homogeneous mass of dough thereby forming an endless homogeneous toroid.

2. The provision of claim 1 wherein said mandrel additionally includes means for rotating the dough strip about its own axis comprising a series of longitudinally spaced arcuately extending ridges disposed on the mandrel outer surface.

3. The provision of claim 2 wherein said means for axially advancing said retarded end of the dough strip so as to contact said other end after the dough strip has been lengthened during axial movement of the dough strip comprises:

an axially extending arcuate segment having a smooth surface and a reduced diameter in contact with said retarded end of the dough strip.

4. The provision of claim 3 wherein said means for kneading and compressing said overlapped ends of said dough strip to work said dough strip ends into a single homogeneous mass of dough comprises an axially extending smooth surface arcuate segment of increased diameter in contact with said overlapped dough strip ends.

5. The provision of claim 4 wherein said means for axially retarding one end of said dough strip relative to the other end comprises at least one curved barrier extending radially from said mandrel and extending axially and over an arcuate segment of said mandrel.

6. In an apparatus for converting a U-shaped strip of dough into a toroid, comprising a toroid forming means including, longitudinally extending substantially cylindrical mandrel, means for supporting the dough strip transvserly of the mandrel axis with the free ends of the U-shaped dough strip directed upwardly, means for providing axial toroid forming movement between the mandrel and the supporting means so that the U-shaped dough strip moves axially relative to the mandrel, the supporting means providing circumferential contact between the mandrel and the strip of dough and compressing the strip of dough so as to lengthen the strip of dough as it moves relative to the mandrel, the provision of:

the cylindrical longitudinally extending mandrel having a first forward axially extending portion supporting radially, axially and arcuately extending curved barrier means, and a series of longitudinally spaced parallel circumferential ridges disposed on said first portion proximate said barrier means;

a second axially extending portion including a series of longitudinally spaced arcuate ridges disposed on a first axially extending segment of no more than 180° lying on one side of an imaginary plane passed longitudinally and vertically through the cylindrical mandrel, said first segment having a first diameter, and a smooth axially extending surface on the complementary segment of the mandrel, said smooth surface second segment having a diameter less than said first segment;

a third axially extending portion including a smooth surface axially extending segment having a diameter greater than said first diameter, said smooth surfaced segment comprising less than 180° and extending substantially equally in a circumferential direction on opposite sides of said imaginary vertical plane, and an axially extending segment complementary to said last-mentioned segment including a series of arcuately extending longitudinally spaced ridges.

7. The provision of claim 6 wherein said no more than 180° segment on said axially extending second portion has an axially rearward decreasing diameter.

8. The provision of claim 7 wherein said axially extending segment on said third portion complementary to said increased diameter smooth surfaced segment has an axially rearward increasing, then decreasing, diameter.

9. The device of claim 8 additionally including an axially extending portion rearward of said third portion having a series of circumferential longitudinally spaced ridges and an undulating diameter.

10. The device of claim 8 additionally including a further rearwardly disposed axially extending discharge portion having a smooth surface.

References Cited
UNITED STATES PATENTS

| | | | |
|---|---|---|---|
| 2,666,398 | 1/1954 | Gendler et al. | 107—8 XR |
| 3,379,142 | 4/1968 | Reiter et al. | 107—8 |
| 3,407,754 | 10/1968 | Wichinsky | 107—8 |

WALTER A. SCHEEL, Primary Examiner

ROBERT I. SMITH, Assistant Examiner